Jan. 27, 1970     R. N. ZITTER     3,492,600
OPTICAL SWITCHES AND MEMORY ELEMENTS BASED ON THE PHENOMENON
OF COMPETING TRANSITIONS IN LASER MEDIA
Filed Sept. 17, 1965
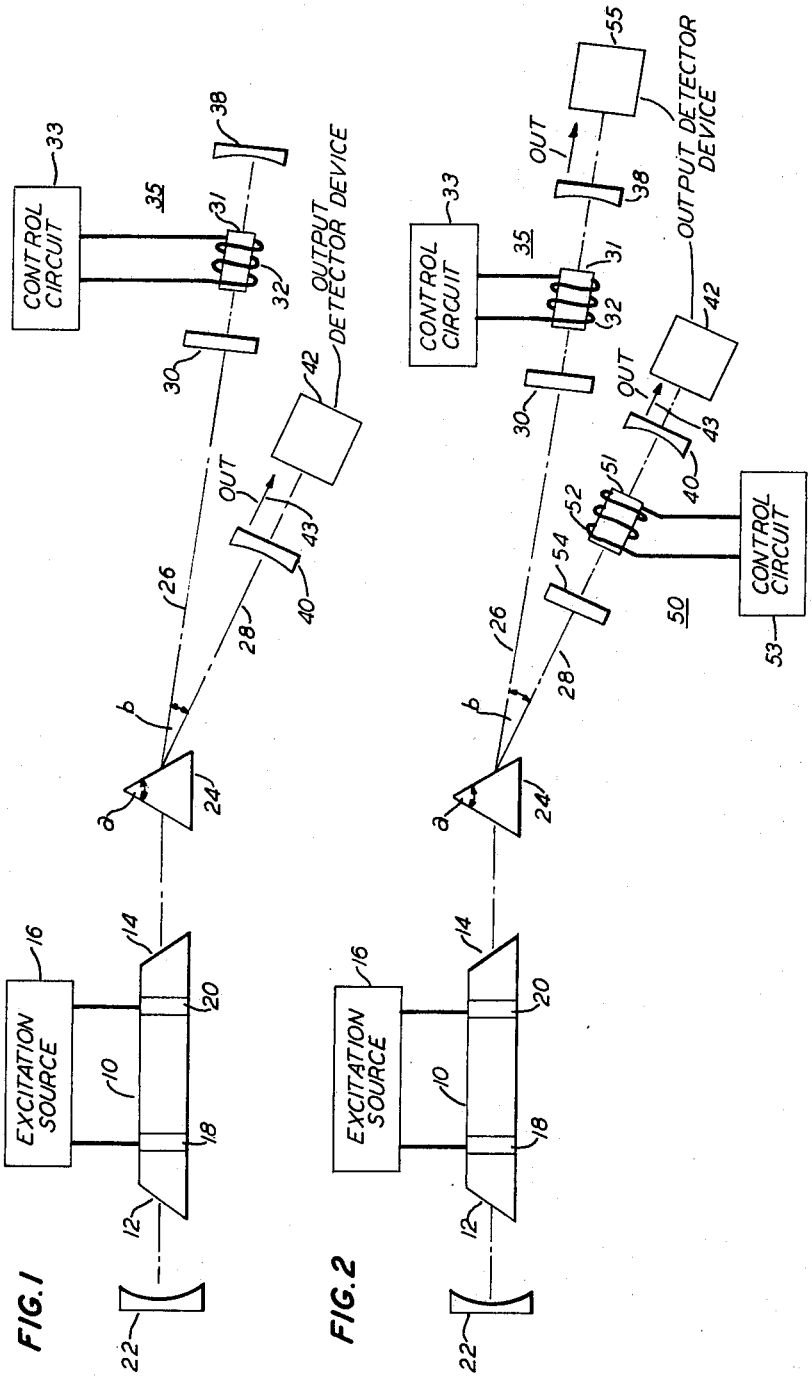
INVENTOR
R.N. ZITTER
BY *Lucian C. Canepa*
ATTORNEY

United States Patent Office 3,492,600
Patented Jan. 27, 1970

3,492,600
OPTICAL SWITCHES AND MEMORY ELEMENTS BASED ON THE PHENOMENON OF COMPETING TRANSITIONS IN LASER MEDIA
Robert N. Zitter, New York, N.Y., assignor to Bell Telephone Laboratories, Incorporated, New York, N.Y., a corporation of New York
Filed Sept. 17, 1965, Ser. No. 488,021
Int. Cl. H01s 3/00
U.S. Cl. 331—94.5
10 Claims

ABSTRACT OF THE DISCLOSURE

A laser arrangement is proportioned to support radiative transitions from a common uppermost energy level to two relatively widely-spaced lower levels. The frequencies associated with these transitions are said to be competing in the sense that radiation at one frequency may sufficiently deplete the population of the common level to prevent the occurrence of radiation at the other frequency. This natural phenomenon is turned to account by providing an optical structure proportioned to support two distinct competing radiative transitions along two fixed and distinct paths each of which includes a stationary mirror member. At least one of these paths includes a shutter for selectively blocking radiation at one frequency thereby allowing radiation at the other frequency to be controlled.

---

This invention relates to signal translating devices and more particularly to optical devices capable of operating as switches and memory elements.

In recent years the development of devices which embody the principle of amplification by the stimulated emission of radiation has extended the range of controlled radiation to the infrared and visible light portions of the electromagnetic spectrum. Such devices are frequently referred to as lasers or optical masers and have been investigated widely for their application in information processing arrangements such as communication and computing systems.

It is characteristic of various well-known laser media that two distinct radiative transitions may take place therein between a common uppermost energy level and two relatively widely-separated lower levels. The frequencies associated with these two transitions are said to be competing in the sense that radiation at one frequency may sufficiently deplete the population of the common level to prevent the occurrence of radiation at the other frequency. This competition phenomenon has been generally regarded to be an undesirable property of lasers. As a result, many techniques have been devised for permanently suppressing one or the other of the two possible transitions, thereby to provide a frequency-selective oscillating or amplifying apparatus.

An object of the present invention is to provide improved optical structures.

More specifically, an object of this invention is to take advantage of the natural occurrence of competing transitions in laser media to provide optical switches and flip-flops whose basic mode of operation depends on selectively controlling a laser to enable it to operate at a frequency corresponding to one or the other of several possible competing radiative transitions.

Another object of the present invention is the provision of optical devices which are characterized by high speed, reliability, simplicity of design and ease of manufacture.

These and other objects of the present invention are realized in a specific illustrative switch embodiment thereof which comprises a stimulated laser medium having a first reflector near one end of the medium and a prism element near the other end thereof. The prism serves to spatially disperse competing radiation received from the medium, whereby radiation at a first frequency is directed along one optical path and radiation at a second frequency is directed along another path. The first-mentioned path includes a shutter mechanism and a second reflector. The positions and angular orientations of the first and second reflectors and the prism element are selected to provide a resonant structure for radiation at the first frequency.

The second-mentioned path includes a third reflector whose position and angular orientation relative to the prism element is such as to support oscillatory action at the second frequency. The third reflector is partially transmissive, thereby to allow a portion of the radiation incident thereon to pass through to a suitable detector device.

Normally (i.e. with the aforementioned shutter mechanism in its open or nonblocking condition) the radiation at the first frequency is predominant and sufficiently depletes the population of the common uppermost energy level to prevent the occurrence of oscillations at the competing frequency. However, when the shutter is closed, oscillations at the first frequency are blocked. Such blockage permits oscillations to build up at the second frequency, whereby an output signal is then supplied to the detector associated with the third reflector. In this way, the occurrence of oscillations at the second frequency is selectively controlled by ON-OFF operation of that portion of the switch structure which propagates radiation at the first frequency.

In a second illustrative embodiment of the principles of the present invention, a shutter mechanism is disposed in each of the dispersed paths defined by the prism. In addition, the parameters of the embodiment are selected such that for each of the two competing radiative transitions separately, the net optical gain for a single pass through the active laser medium is slightly greater than unity. However, with both shutters open, only one of the competing frequencies can oscillate at any given time because such oscillation depletes the population of the common energy level and thereby lowers the gain of the competing transition to less than unity. Therefore, by closing one shutter and leaving the other one open, the frequency at which oscillations occur can be selectively controlled in a bistable manner, whereby an optical device capable of flip-flop action is provided.

It is a feature of the present invention that an optical structure proportioned to support two distinct competing radiative transitions be provided with a shutter arrangement for selectively blocking radiation at one frequency, thereby allowing the occurrence of radiation at the other frequency to be controlled.

It is another feature of this invention that an optical structure be proportioned to support two competing radiative transitions, one of which normally predominates and prevents the other from occurring, that the structure include a prism element for dispersing the energy derived from the competing radiative transitions along two distinct optical paths, and that a shutter mechanism be disposed in the path associated with the predominant transition for selectively regulating the occurrence thereof, thereby to control the occurrence of radiation in the other path in an ON-OFF manner.

It is still another feature of the present invention that an optical structure be proportioned to support two competing radiative transitions whose net gain is such that either but not both simultaneously can occur in a sustaining manner, that the structure include a prism element for dispersing the competing frequencies along two distinct optical paths, and that each path include a shutter mechanism for selectively blocking the occurrence of radiation, whereby bistable control of the radiative condition of the structure is provided.

A complete understanding of the present invention and of the above and other objects, features and advantages thereof may be gained from a consideration of the following detailed description of two specific illustrative embodiments presented hereinbelow in connection with the accompanying drawing, in which:

FIG. 1 depicts a specific illustrative optical switch made in accordance with the principles of the present invention; and FIG. 2 shows a specific optical flip-flop which also embodies the principles of this invention.

The switch embodiment shown in FIG. 1 includes a laser tube 10 having Brewster angle end windows 12 and 14 and containing therein a suitable medium such as, for example, a gaseous mixture of helium and neon. Such a mixture is well-known in the art to be adapted to serve as the active medium of a laser apparatus. In a stimulated mixture of this type, radiative transistions can occur from a common uppermost energy level to two relatively widely-spaced lower levels. Specifically, in a helium-neon system these two transitions may correspond respectively to infrared and visible radiation at wavelengths of 3.39 and .6328 micron.

The embodiment of FIG. 1 further includes an excitation or stimulation source 16 connected to two electrodes 18 and 20 disposed about the tube 10. Spaced from the window 12 of the tube 10 is an end reflector 22. A dispersive element is spaced from the other window 14. Illustratively, the dispersive element is a quartz prism member 24 having its entry and exit faces oriented to form an apex angle $a$ of approximately 55 degrees thereby to minimize reflection losses. The member 24 serves to disperse any radiation directed thereat from the tube 10 (at 3.39 and .6328 micron) along two distinct optical paths represented by dashed lines and designated 26 and 28 respectively. Illustratively, the angular separation $b$ between the 3.39 micron path 26 and the .6328 micron path 28 approximates several degrees.

Disposed in the path 26 shown in FIG. 1 is a polarizer 30, for example a calcite plate member, which is effective to pass therethrough only that component of radiation at 3.39 microns which corresponds to predetermined plane of polarization. The path 26 also includes therein a shutter mechanism 35 which illustratively comprises an element 31 of yttrium iron garnet (YIG) having wrapped thereabout a coil 32 that is connected to a control circuit 33. Whenever the coil 32 is energized by the circuit 33 to establish a magnetic field in the element 31, the plane of polarization of radiation propagated through the element 31 is rotated by 45 degrees. (If no magnetic field is established in the element 31, the plane of polarization of radiation transmitted therethrough is not rotated.) Lastly, the path 26 includes a reflector 38 characterized by a high reflectance for incident radiation at 3.39 microns. The plane of polarization of radiation reflected from the reflector 38 back toward the polarizer 30 is rotated an additional 45 degrees if the YIG element 31 is magnetically activated. Thus, the element 31 is effective when activated to rotate the plane of polarization of the 3.39 micron radiation by a total of 90 degrees during two transits therethrough. Radiation whose plane of polarization has been so rotated is blocked by the polarizer 30 (then acting as an analyzer) from propagating along the path 26 to the prism 24.

The .6328 micron path, designated 28 in FIG. 1, comprises a reflector 40 whose reflectance is relatively high, for example 98 percent, for .6328 micron radiation. Some of the radiation directed at the reflector 40 is transmitted therethrough to impinge on an output detector device 42. Thus, whenever radiation is propagated along the path 28, a portion thereof is transmitted in the direction of vector 43 to the device 42.

In operation, the gaseous mixture included in the tube 10 of FIG. 1 is stimulated by the source 16 to allow the possible occurrence therein of lasing transitions from the aforementioned uppermost comon energy level to two lower levels corresponding respectively to radiation at wavelengths of 3.39 and .6328 micron. The parameters of the depicted apparatus are selected such that the net gain of the apparatus for each transition separately is greater than unity. However, the 3.39 micron transition inherently predominates because the gain associated therewith its controlled to be considerably greater than unity and considerably greater than that of .6328 micron transition. Unless this predominant transition is suppressed, radiation at 3.39 microns sufficiently depletes the atomic population of the common level to make it impossible for a substantial transition to occur at .6328 micron. Thus, whenever the shutter mechanism 35 is deactivated (non-blocking), radiation at 3.39 microns is propagated through the tube 10 and between the resonantly-positioned reflectors 22 and 38, thereby to prevent radiation from occurring along the .6328 micron path 28. In this case, no ratiation at .6328 micron is detected by the output device 42. Under such circumstances, the switch of FIG. 1 can be regarded as being in its OFF condition.

However, when the shutter mechanism 35 is activated to block the occurrence of radiation at 3.39 microns, radiation at .6328 micron then propagates in a sustaining manner through the tube 10 and between the resonantly-positioned reflectors 22 and 40, whereby a portion of the .6328 micron radiation is transmitted through the reflector 40 to the output detector device 42. The illustrative switch is then in its ON condition.

Thus, in the specific manner described above, reliable ON-OFF operation of the illustrative optical switch shown in FIG. 1 is possible simply by selectively controlling the magnetic condition of the YIG element 31.

FIG. 2 depicts a memory element or flip-flop whose mode of operation and arrangement are closely patterned after the aforedescribed illustrative switch. Certain of the individual components of the FIG. 2 element may, for example, be identical to those included in FIG. 1. Such components are identified in FIG. 2 by the same reference numerals employed above.

The parameters of the exemplary arrangement shown in FIG. 2 are selected such that the net gain of each of two competing radiative transitions characteristic thereof is separately slightly greater than unity. (These two transitions will again be considered to be those associated with wavelengths of 3.39 and .6328 micron.) However, only one of these competing frequencies can oscillate at any given time because such oscillation reduces the gain of the competing transition to less than unity. When oscillation at one frequency is blocked, even momentarily, such as by a shutter mechanism, oscillation at the competing frequency will commence and sustain, preventing the former frequency from oscillating.

It is well-known in the laser art that the net gain associated with the radiative transitions considered herein can be selectively determined by controlling such factors as: (1) the pressure, temperature or ratio of the gases within the tube 10; (2) the excitation current supplied by the source 16; (3) the reflectances of the reflectors 22, 38 and 40; (4) the loss characteristics of the various transmissive elements disposed in the paths 26 and 28; and (5) the diameter of the tube 10.

The FIG. 2 arrangement differs from the switch shown in FIG. 1 in that the .6328 micron path 28 also comprises a shutter mechanism and a polarizer-analyzer. Illustratively, the mechanism 50 may be identical to that included in each of the paths 26 of FIGS. 1 and 2, and the polarizer-analyzer 54 may be identical to the element 30 of FIGS. 1 and 2. Furthermore, the FIG. 2 arrangement includes an additional output detector device 55.

When the shutter mechanism 50 in FIG. 2 is activated to a closed or blocking condition, the path 28 is in effect prevented from supporting the propagation of radiation at .6328 micron. As a result, sustaining radiation at 3.39 microns is established in the path 26 (assuming the shutter mechanism 35 is in its nonblocking condition), whereby an output signal at 3.39 microns is supplied to the detector device 55. The device 55 continues to register an output indication so long as the shutter mechanism 35 remains deactivated (nonblocking).

To extinguish the transmission of energy at 3.39 microns to the output detector device 55, and to obtain transmission of energy at .6328 micron to the output detector device 42, the shutter mechanism 35 is activated to its blocking condition while the mechanism 50 is operated to its nonblocking state. At a subsequent time, the shutter mechanism 35 may be returned to a nonblocking condition (with the mechanism 50 also unblocked) without altering the outputs of the detector devices 42 and 55.

If then the mechanism 50 is activated to a blocking condition (with the mechanism 35 unblocked), the detector device 42 will cease to register the presence of .6328 micron radiation while the detector device 55 will commence to register the presence of 3.39 micron radiation. Subsequent unblocking of the mechanism 50 (with the mechanism 35 still unblocked) will not alter the outputs of the detector devices 42 and 55.

Thus, there have been described in detail above two specific illustrative embodiments of the principles of the present invention. These embodiments take advantage of the natural occurrence of competing transitions in laser media to provide optical devices whose basic mode of operation depends on selectively controlling an apparatus to enable it to operate at a frequency corresponding to one or the other of two possible competing radiative transitions.

It is to be understood that the above-described arrangements are only illustrative of the application of the principles of the present invention. In accordance with these principles numerous other arrangements may be devised by those skilled in the art without departing from the spirit and scope of the invention. For example, the art is replete with descriptions of alternative dispersive members, shutter mechanisms and polarizer-analyzers which are well-suited for inclusion in the devices illustrated in FIGS. 1 and 2. Furthermore, there exist various shutter devices whose operation does not depend on the state of polarization of incident radiation, and hence the aforementioned polarizer-analyzers may be omitted when such shutter devices are employed.

What is claimed is:

1. In combination, a laser structure which is adapted to support radiative transitions from a common uppermost level to two relatively widely-spaced lower levels, means coupled to said laser structure for dispersing the radiation associated with the transitions between said common level and said two lower levels along two fixed and distinct resonantly-proportioned optical paths each of which is terminated by a stationary mirror member which is disposed in its respective path to reflect substantially all of the radiation incident thereon back along its respective path to said dispersing means, means in one of said paths positioned intermediate said dispersing means and the stationary mirror member included in said one path for selectively inhibiting the propagation of radiation in said one path, and means coupled to the other one of said paths for detecting the radiative condition thereof.

2. In combination, a laser arrangement which includes an active medium capable of being stimulated to a condition in which radiative transitions may take place between a common uppermost energy level and two relatively widely-separated lower levels, means responsive to energy derived from said two radiative transitions for spatially dispersing said energy along two fixed and distinct resonantly-proportioned optical paths, resonator means, including a stationary end mirror member in each of said paths, associated with said medium for supporting oscillatory action along said paths at frequencies respectively corresponding to said transitions, each of said mirror members being disposed in its respective path to reflect substantially all of the radiation incident thereon back along its respective path to said dispersing means, and means disposed in at least one of said paths intermediate said dispersing means and the stationary mirror member in said path for selectively blocking in a controlled manner the propagation of radiation therealong.

3. A combination as in claim 2 wherein said medium comprises a gaseous mixture of helium and neon.

4. A combination as in claim 3 wherein said dispersing means comprises a prism.

5. A combination as in claim 4 wherein said resonator means includes a reflector disposed in each of said paths.

6. A combination as in claim 5 wherein said blocking means includes an element of yttrium iron garnet, means for establishing a magnetic field in said element, and a polarizer-analyzer member, said element being positioned between said member and said establishing means.

7. An optical device comprising laser means adapted to support radiative transitions from a common uppermost energy level to two relatively widely-separated lower levels, one of said transitions being inherently predominant,
means associated with said laser means for spatially dispersing energy at the two frequencies respectively corresponding to said transitions along first and second fixed and distinct resonantly-proportioned optical paths each of which is terminated by a stationary mirror member which is disposed in its respective path to reflect substantially all of the radiation incident thereon back along its respective path to said dispersing means,
and means disposed in said first path, along which energy derived from said predominant transition is propagated, for blocking oscillatory action therein in a selective ON-OFF manner, said blocking means being disposed intermediate said dispersing means and the stationary mirror member included in said first path,
whereby oscillatory action occurs in the second path whenever the propagation of energy in the first path is blocked.

8. A combination as in claim 7 further including means coupled to said second path for detecting the occurrence of oscillatory action therein.

9. An optical device comprising laser means adapted to support radiative transitions from a common uppermost energy level to two relatively widely-separated lower levels, the net gain associated with each transition being separately slightly greater than unity,
means associated with said laser means for spatially dispersing the two frequencies respectively corresponding to said transitions along first and second fixed and distinct resonantly-proportioned optical paths each of which is terminated by a stationary mirror member which is disposed in its respective path to reflect substantially all of the radiation incident thereon back along its respective path to said dispersing means,
and means disposed in each of said first and second paths intermediate said dispersing means and the respective stationary members for blocking oscillatory action therein, whereby oscillatory action occurs in a particular path whenever the propagation of energy therealong is not blocked and the propagation of energy along the other path is at least momentarily blocked.

10. A combination as in claim 9 further including means coupled to each of said first and second paths for detecting the occurrence of oscillatory action therein.

References Cited

Bloom, Observation of New Visible Gas Laser Transitions by Removal of Dominance, Appl. Phys. Letters, vol. 2, No. 5 (Mar. 1, 1963) pp. 101–102.

Spectra-Physics circular on their Model 116 High-Gain/Multi-Wavelength Gas Laser.

German Printed application, Spectra-Physics, Inc., 1,194,977, June 16, 1965.

JEWELL H. PEDERSEN, Primary Examiner

W. L. SIKES, Assistant Examiner

U.S. Cl. X.R.

350—150, 168